United States Patent [19]

Marusik et al.

[11] Patent Number: 5,521,808
[45] Date of Patent: May 28, 1996

[54] METHOD AND CIRCUITRY FOR CONTROLLING START-UP CHARACTERISTICS OF A MAGNETIC AMPLIFIER CONTROL CIRCUIT

[75] Inventors: C. Lee Marusik, McKinney; Edward Johnson, Plano, both of Tex.

[73] Assignee: Alcatel Network Systems, Inc., Richardson, Tex.

[21] Appl. No.: 239,157

[22] Filed: May 6, 1994

[51] Int. Cl.$^6$ .................................................. H02M 7/517
[52] U.S. Cl. .................................................. 363/49; 363/91
[58] Field of Search .................................. 323/249, 254; 363/490, 82, 90, 91

[56] References Cited

U.S. PATENT DOCUMENTS

| | | | |
|---|---|---|---|
| 4,315,304 | 2/1982 | Marez et al. | 363/49 |
| 4,447,866 | 5/1984 | Reeves | 363/82 |
| 4,451,876 | 5/1984 | Ogata | 353/91 |
| 4,462,069 | 7/1984 | Becky | 363/91 |
| 4,626,976 | 12/1986 | Abe et al. | 363/91 |
| 4,642,743 | 2/1987 | Radcliffe | 363/21 |
| 4,700,280 | 10/1987 | Onda et al. | 363/19 |
| 4,811,187 | 3/1989 | Nakajima et al. | 363/91 |
| 4,931,918 | 6/1990 | Inou et al. | 363/91 |

Primary Examiner—Jeffrey L. Sterrett
Attorney, Agent, or Firm—Baker & Botts

[57] ABSTRACT

Start-up control circuit (152) regulates the output voltage ($V_{OS}$) of a power supply circuit (150). Magnetic amplifier control circuit (54) includes magnetic amplifier (42) and error detection circuitry (58, 68, and 70). Start-up control circuit (152) includes sensing circuitry (76 and 184) for generating sensing signals in response to voltage levels ($V_{CC}$ and $V_{EE}$) in error detection circuitry (58, 68, and 70). Sensing signals indicate whether error detection circuitry (58, 68, and 70) voltage levels are sufficient to drive magnetic amplifier control circuit (54). Reset circuitry (190 and 192, and 194) associates with the sensing circuitry (76 and 184) for initially resetting magnetic amplifier (42) to prohibit output voltage ($V_{OS}$) from power supply circuit (150) when the sensing signals indicate that voltage levels are insufficient for error detection circuitry to drive magnetic amplifier control circuit (54). Reset circuitry (190 192, and 194) further associates with reset control transistor (76) for controllably decreasing the reset of magnetic amplifier (42). Reset circuitry (190, 192, and 194) further associates with magnetic amplifier control circuit (54) for shifting control of magnetic amplifier (42) to magnetic amplifier control circuit (54) as voltage levels increase sufficiently for the error detection circuitry (58, 68, 70) to drive magnetic amplifier control circuit (54).

12 Claims, 3 Drawing Sheets

METHOD AND CIRCUITRY FOR CONTROLLING START-UP CHARACTERISTICS OF A MAGNETIC AMPLIFIER CONTROL CIRCUIT

TECHNICAL FIELD OF THE INVENTION

The present invention is generally concerned with electronic circuits and, more specifically, with power supply circuitry. Even more specifically, the present invention is concerned with a method and circuitry for controlling start-up characteristics of a power supply that employs a magnetic amplifier post regulator to provide voltage regulation of an auxiliary output.

BACKGROUND OF THE INVENTION

The magnetic amplifier post regulator is a popular way to regulate the auxiliary outputs of a switched-mode power supply (SMPS). The SMPS couples power from a primary circuit to a main output circuit and an auxiliary output circuit through a transformer. A power width modulator and a power switch transistor control the transfer of power from the primary circuit. Therefore, the SMPS produces a main output voltage $V_{OM}$ and an auxiliary output voltage $V_{OS}$. Magnetic amplifiers provide a simple, efficient, and reliable way of providing precise voltage regulation of independent outputs of a multiple output SMPS. The magnetic amplifier post regulator includes a magnetic amplifier, a reset transistor, and an error amplifier.

The error amplifier generates an error signal in response to sensing the auxiliary output circuit voltage, $V_{OS}$. The error amplifier produces the error signal to control the blocking time of the magnetic amplifier by providing the appropriate reset of the magnetic amplifier core flux during $T_{OFF}$ of the power switch transistor. If the output voltage $V_{OS}$ is too high, the error amplifier turns the reset transistor on harder to supply more reset current into the magnetic amplifier in the reverse direction. Increasing the reset of the magnetic flux causes the blocking time of the magnetic amplifier to increase. This causes $V_{OS}$ to decrease. Similarly, if $V_{OS}$ is too low, the error amplifier causes the reset current to decrease, which in turn causes $V_{OS}$ to increase. This current reset technique then resets the magnetic amplifier core to a level that yields the correct reset time for the desired $V_{OS}$.

The magnetic amplifier core may also be reset using a voltage reset technique. In the voltage reset technique, voltage clamping is applied at the output side of the magnetic amplifier. The current reset technique is more popular because of its ease of implementation and because it exhibits lower phase lag at high frequencies than does the voltage reset technique. Regardless of which reset technique the SMPS employs, the error amplifier is unable to control the reset of the magnetic amplifier core until its voltage rails, $V_{CC}$ and $V_{EE}$, are established and the error amplifier output can slew sufficiently to gain control. A simple and cost-effective way to generate $V_{CC}$ and $V_{EE}$ is to use linear post regulators on additional auxiliary windings of the transformer. Unfortunately, it takes a finite time for these voltages to reach steady-state after applying input voltage $V_{IN}$. Furthermore, the error amplifier slew rate is limited by the bandwidth necessary to yield adequate stability margins over all operating conditions.

In the meantime, the magnetic amplifier saturates within the first or second cycle of operation of the power switch transistor. The magnetic amplifier remains saturated until the error amplifier is able to provide reset current to the magnetic amplifier. This, unfortunately, causes overshoot of output voltage $V_{OS}$.

There is a need, therefore, for a method and system for preventing output voltage overshoot and for controlling $V_{OS}$ until the error amplifier of the magnetic amplifier post regulator assumes control of the magnetic amplifier.

There is a need for a method and system that protects power supply loads against overvoltage conditions during start-up of an SMPS which employs magnetic amplifier post regulators to provide regulated power to the loads.

There is a need for a method and system for providing a well behaved increase in the auxiliary output voltages that a magnetic amplifier post regulator controls during start-up.

There is a further need for a general improvement in the overall start-up characteristics of the magnetic amplifier in a magnetic amplifier post regulator for a multiple output power supply.

SUMMARY OF THE INVENTION

Accordingly, the present invention provides a magnetic amplifier start-up control circuit for controlling start-up characteristics of a switched mode power supply with a magnetic amplifier post regulator that overcomes limitations and disadvantages associated with existing methods of control and that includes circuitry for instantaneously holding the magnetic amplifier in the complete blocking state and maintaining the blocking condition until the error amplifier circuit becomes fully operational.

According to one aspect of the invention, there is provided a start-up control circuit for regulating the output voltage of a power supply having a magnetic amplifier control circuit. The magnetic amplifier control circuit includes the magnetic amplifier and error detection circuitry. The start-up control circuitry includes sensing circuitry for generating sensing signals in response to voltage levels in the error detection circuitry. The sensing signals indicate whether the error detection circuitry voltage levels are sufficient to drive the magnetic amplifier control circuit. Reset circuitry associates with the sensing circuitry and the magnetic amplifier control circuit for initially resetting the magnetic amplifier to prohibit output voltage from the power supply circuit when the sensing signals indicate that the voltage levels are insufficient for the error detection circuitry to drive the magnetic amplifier control circuitry. The reset circuitry further associates with the magnetic amplifier control circuit for controllably decreasing the reset of the magnetic amplifier for controllably increasing the output voltage from the power supply circuit. The reset circuitry also associates with the magnetic amplifier control circuit for shifting control of the magnetic amplifier to the magnetic amplifier control circuit as the voltage levels increase sufficiently for the error detection circuitry to drive the magnetic amplifier control circuit and, thereby, control operation of the magnetic amplifier for regulating the output voltage from the power supply circuit.

A technical advantage of the present invention is that it prevents output voltage overshoot from the power supply circuit during start-up. This protects against over-voltage conditions to the loads receiving the output voltage $V_{OS}$ from the switched-mode power supply (SMPS).

Another technical advantage of the present invention is that it provides a well-behaved output voltage $V_{OS}$ to load circuitry during start-up. This generally improves the start-up characteristics of the SMPS.

Yet another technical advantage of the present invention is that it prevents spurious shutdown conditions due to over-voltage occurring in the start-up of the switched-mode power supply.

BRIEF DESCRIPTION OF THE DRAWINGS

The invention and its modes of use and advantages are best understood by reference to the following description of illustrative embodiments when read injunction with the accompanying drawings, wherein.

DETAILED DESCRIPTION OF THE INVENTION

The illustrative embodiments of the present invention are best understood by referring to the FIGURES wherein like numerals are used for like and corresponding parts of the various components.

The present invention includes, among other aspects, two predominant features. One feature includes a self-bias control circuit for controlling start-up characteristics of the magnetic amplifier post regulator in a switched-mode power supply (SMPS). The circuit instantaneously holds the magnetic amplifier in the blocking mode until the error amplifier becomes operational. Another aspect of the present invention is an auxiliary reset winding that is added to extend the dynamic range of the SMPS magnetic amplifier post regulator to permit shutdown mode operation. The following discussion details how the present embodiment accomplishes these results.

Figure 1:
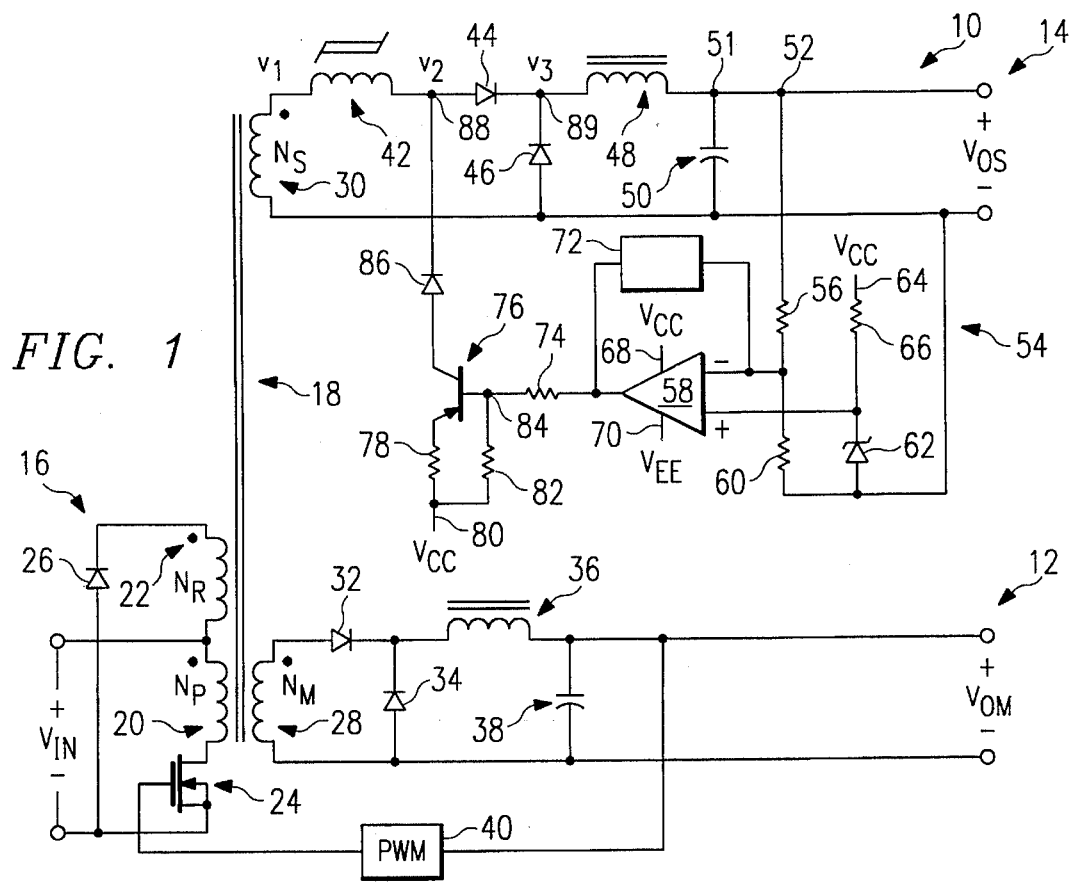
FIG. 1 shows the present embodiment of the switched-mode power supply for establishing the environment of the present invention.

In FIG. 1, SMPS 10 includes main output circuit 12 and auxiliary output circuit 14. Main output circuit 12 is in electrical communication with primary circuit 16 through transformer 18. Primary circuit 16 includes primary winding 20, having $N_P$ turns, and reset winding 22, having $N_R$ turns. When power switch transistor 24 is conducting, i.e., during the on-time $T_{ON}$, current flows through primary winding 20. Through primary winding 20, primary circuit 16 provides voltage to main winding 28 and auxiliary winding 30 during the conduction time $T_{ON}$. Diode 26, by permitting current to flow only when it is forward biased, clamps the voltage that appears across reset winding 22 during the off-time, $T_{OFF}$, of power switch transistor 24 to reset the magnetic flux in transformer 18.

In main output circuit 12, diodes 32 and 34 rectify the voltage waveform appearing at main winding 28. Inductor 36 and capacitor 38 filter the rectified voltage to produce a DC output voltage $V_{OM}$. SMPS 10 maintains output voltage regulation of the main output voltage $V_{OM}$ using PWM 40 by controlling the duty cycle of power switch transistor 24. For constant frequency operation, PWM 40 controls the conduction time $T_{ON}$ of power switch transistor 24 as necessary to keep $V_{OM}$ in regulation.

In auxiliary circuit 14, magnetic amplifier 42 operates as a magnetic switch to reduce the duty cycle of the voltage that appears in the rest of auxiliary circuit 14 from the duty cycle of voltage $v_1$ which appears across auxiliary winding 30. Magnetic amplifier 42 reduces the duty cycle by delaying the leading edge of the voltage waveform. During its blocking time, magnetic amplifier 42 is in a high impedance state. This blocks current flow through magnetic amplifier 42. When magnetic amplifier 42 saturates, its impedance drops to near zero. This allows current to flow through diode 44 and into inductor 48. During $T_{OFF}$, inductor 48 current flows through diode 46. The AC component of inductor 48 current flows through smoothing capacitor 50, and the DC component flows through the load that receives $V_{OS}$.

Magnetic amplifier control circuit 54 connects at node 52 to control the blocking time of magnetic amplifier 42. Through resistor 56, a sample of the output voltage $V_{OS}$ goes to error amplifier 58. Error amplifier 58 compares the $V_{OS}$ sample to a reference voltage that appears across reference zener diode 62. In response to this comparison, error amplifier 58 generates an error signal which magnetic amplifier control circuit 54 applies to reset transistor 76 through resistor 74. Compensation network 72 shapes the frequency response to achieve the desired stability margin for the feedback loop. The error signal at the output of error amplifier 58 causes reset transistor 76 to provide reset current into magnetic amplifier 42 during $T_{OFF}$. Also during $T_{ON}$, diode 86 is reverse-biased. This prevents loading the magnetic amplifier 42 output into reset transistor 76. In steady-state, the error signal at the output of error amplifier 58 provides the necessary magnetic amplifier 42 reset current to achieve the desired $V_{OS}$ regulation.

FIG. 2 shows timing diagrams 100 taken at various points in auxiliary output circuit 14 to illustrate how the present embodiment controls $V_{OS}$. In particular, timing diagram 102 shows the $v_1$ voltage that appears across auxiliary winding 30 at the $v_1$ node of FIG. 1. Thus, for any cycle, the $v_1$ voltage begins at zero volt level 104 and, during $T_{ON}$, rises to level 106. The value of level 106 is determined by the ratio of the number of turns in auxiliary winding 30, $N_S$, to the number of turns in the primary winding 20, $N_P$, multiplied by input voltage $V_{IN}$. When power transistor 24 turns off, i.e., at $T_{OFF}$, the $v_1$ voltage obtains a negative value where it remains until the transformer 18 magnetic flux resets. Once transformer 18 resets, i.e., at $T_D$, the $v_1$ voltage resumes its original zero value.

Line 112 of FIG. 2 depicts the operation of magnetic amplifier 42 to produce the $v_2$ voltage that appears at node 88. The rise from the zero voltage level 114 to the positive level 116 is delayed by blocking time $T_B$. During the magnetic amplifier firing time, $T_F$, the $v_2$ voltage level maintains level 116. The $v_2$ voltage falls to negative level 118 during magnetic amplifier reset time $T_R$. Magnetic amplifier 42 withstands the volt-second product that shaded area 120 shows during blocking time $T_B$. To accomplish this, the magnetic amplifier 42 core is reset by the volt-second product that shaded area 121 depicts during reset time $T_R$.

Line 122 represents the voltage $v_M$ that appears across the magnetic amplifier 42. The magnetic amplifier 42 voltage rises to level 126 during blocking time $T_B$ of magnetic amplifier 42. From level 126, the magnetic amplifier 42 voltage decreases to zero volt level 124 when magnetic amplifier 42 saturates. During the reset time $T_R$ of magnetic amplifier 42, negative $v_R$ voltage level 128 appears across magnetic amplifier 42. Thereafter, the $v_M$ voltage returns to level 124 until the next cycle. Diode 44 passes the positive portion and diode 46 clips the negative portion of $v_2$ waveform 112 to form $v_3$ voltage waveform 132. This is the voltage that exists prior to reaching the filter circuit that inductor 48 and capacitor 50 form. That is, the $v_3$ voltage begins at a zero volt value 134 to rise to level 136. This continues until the voltage decreases back to zero level 134. The $v_3$ voltage level holds this level until being turned on again at $T_F$ to reach level 136. The present embodiment, therefore, controls the magnetic amplifier blocking time $T_B$ to achieve the desired $v_3$ duty cycle in line 132.

Referring further to FIG. 2, the positive voltage $v_1$ that appears across the auxiliary winding 30 of transformer 18 is proportional to the voltage which appears across the primary winding, $V_{IN}$, by the transformer turns ratio, $N_S/N_P$. Magnetic amplifier 42, which is a coil of wire wound on a magnetic core of square hysteresis loop material, provides voltage regulation of $V_{OS}$ by delaying the leading edge of $v_1$ voltage waveform 102. The magnetic amplifier is in a high impedance state during $T_B$ for blocking the voltage that appears at auxiliary winding 30. When the magnetic amplifier 42 core saturates, its impedance drops to near zero, at which point magnetic amplifier 42 is effectively a closed switch.

The $v_2$ voltage waveform 112 shows the voltage at the output side of magnetic amplifier 42, where $T_B$ is the blocking time and $T_F$ is the firing time of the magnetic amplifier. The core must withstand the volt-second product of the positive voltage amplitude and the blocking time $T_B$. To accomplish this, the magnetic amplifier 42 core must be reset by the same volt-second product during the negative portion of the voltage waveform. The cross-hatched areas 120 and 121 in voltage waveform $v_2$ of line 112 represent these volt-second products. The leading edge modulation that yields cross-hatched area 120 alters the duty cycle of the rectified $v_3$ voltage that appears at the input of inductor 48 and capacitor 50 at node 51.

Error amplifier 58 controls the blocking time, $T_B$, of magnetic amplifier 42 by providing the appropriate reset of the magnetic amplifier core flux during $T_{OFF}$. If the output voltage $V_{OS}$ is too high, error amplifier 58 turns reset transistor 76 on harder to supply more reset current into magnetic amplifier 42 in the reverse direction. Increasing the reset of the magnetic core causes the $T_B$ to increase. This causes $V_{OS}$ to decrease. Similarly, if $V_{OS}$ is too low, error amplifier 58 causes the reset current to decrease. This causes $V_{OS}$ to increase. This current reset technique then resets the magnetic amplifier 42 to a flux level that yields the correct $T_B$ for the desired $V_{OS}$.

Note that the magnetic amplifier 42 core may also be reset using a voltage reset technique. In a voltage reset technique applying a proper voltage clamping level at the output side of magnetic amplifier 42 provides the desired core reset. The current reset technique is more popular because of its ease of implementation, and because it exhibits lower phase lag at high frequencies than does voltage reset. Regardless of which reset technique the present embodiment employs, error amplifier 58 is unable to control the reset of the magnetic amplifier core until its voltage rails $V_{CC}$ and $V_{EE}$ are established and error amplifier output can slew sufficiently to gain control. A simple and cost-effective way to generate $V_{CC}$ and $V_{EE}$ is to use linear post regulators on additional auxiliary windings of transformer 18. Unfortunately, it takes a finite time for these voltages to reach steady-state after applying input voltage $V_{IN}$. Furthermore, the error amplifier 58 slew rate is limited by the bandwidth necessary to yield adequate stability margins over all operating conditions.

In the meantime, magnetic amplifier 42 saturates within the first or second cycle of operation of the power switch transistor 24. Magnetic amplifier 42 remains saturated until error amplifier 58 is able to provide sufficient reset current to reset to the magnetic amplifier 42 core. Without pulse blocking, the duty cycle of the $v_3$ voltage is excessive at the start-up of SMPS 10. This, unfortunately, causes $V_{OS}$ overshoot.

Start-Up Control

Figure 3:
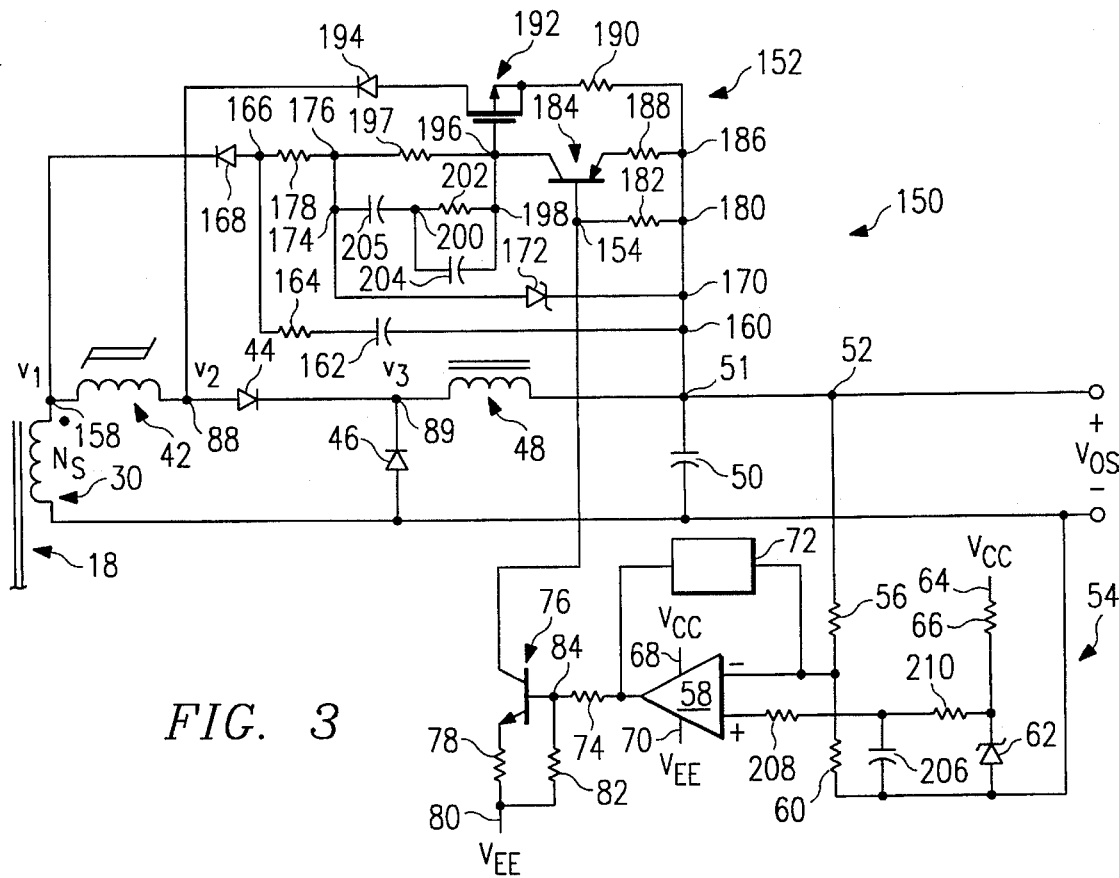
FIG. 3 shows the magnetic amplifier start-up control circuit for the auxiliary circuit of the present embodiment.
Figure 2A:
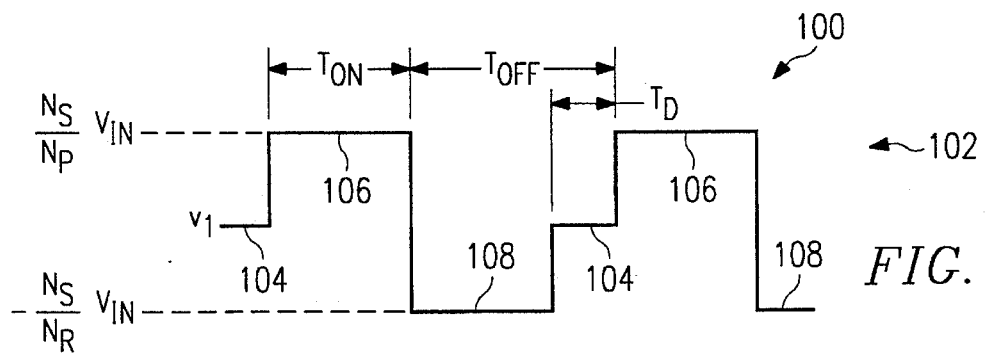
FIG. 2 shows timing diagrams relating to various nodes within the switched-mode power supply of FIG. 1.
Figure 2B:
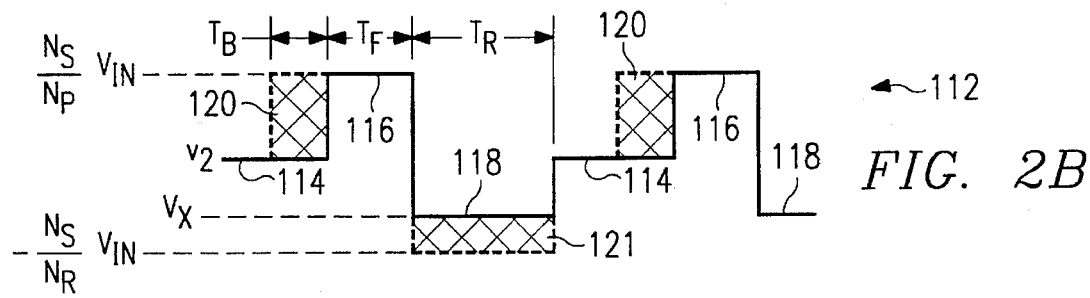
Figure 2C:
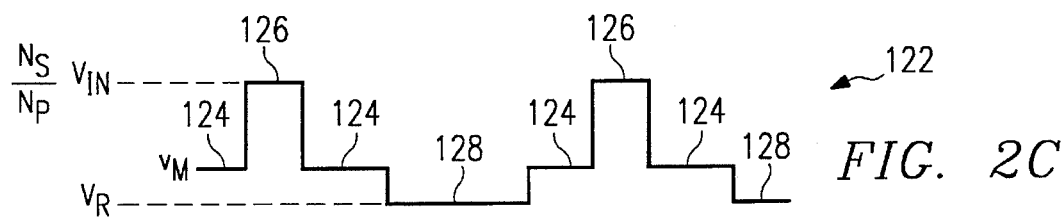
Figure 2D:
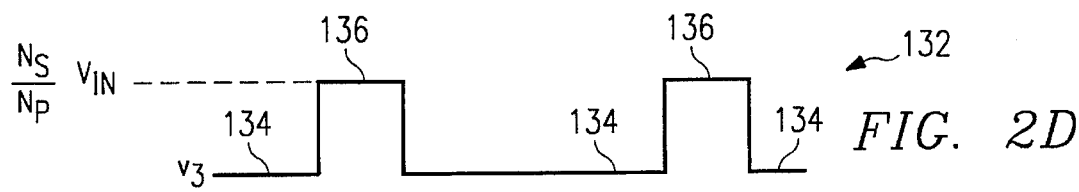

To remedy the $V_{OS}$ overshoot problem, the present embodiment provides modified secondary circuit 150 of FIG. 3. Note that FIG. 3 omits the SMPS 10 primary circuit 16 and main output circuit 12 for simplicity. These circuits are to be considered, however, as part of the present embodiment. In modified auxiliary output circuit 150, primary circuit 16 provides voltage to auxiliary winding 30 during $T_{ON}$. Magnetic amplifier 42, during $T_B$, blocks the flow of current from auxiliary winding 30. During $T_F$, magnetic amplifier 42 saturates to allow current flow from auxiliary winding 30 through diode 44 to the filter circuit of inductor 48 and capacitor 50.

Control circuitry for providing the desired reset function to magnetic amplifier 42 includes start-up control circuit 152. To receive the output from transistor 76, start-up control circuit 152 connects to node 154. Further, start-up control circuit 152 connects to node 88 between magnetic amplifier 42 and diode 44. At node 158, start-up control circuitry 152 connects to the output of auxiliary winding 30. Current from node 51 goes via node 160 to capacitor 162 and resistor 164 and from there to node 166. When diode 168 is forward biased, current flows to node 158. Current from node 51 also goes to node 170. When zener diode 172 is in reverse breakdown, it will conduct to pass current to node 174 and node 176. Resistor 178 separates node 166 from node 176 to limit current flow through zener diode 172. Further from node 51 current flows to node 180 which resistor 182 separates from node 154 at the base of transistor 184. From node 186, current flows through resistor 188 to the emitter of transistor 184. In addition, from node 186 current flows through resistor 190 to the source of power MOSFET 192. From MOSFET 192, current flows to diode 194. When diode 194 is forward biased, current flows to node 88. Node 196 at the gate of MOSFET 192 serves as the collector node for transistor 184. Node 196 also connects through resistor 197 to node 176 as well as to node 198. From node 198, connections exist to node 200 via resistor 202 and capacitor 204. Capacitor 205 separates node 200 from node 174.

Start-up control circuit 152 overcomes the problem of $V_{OS}$ overshoot by holding magnetic amplifier 42 in full shutdown, with $T_B$ equal to $T_{ON}$, until error amplifier 58 becomes operational. Start-up control circuit 152 then gradually decreases the magnetic amplifier 42 reset current at a rate established by error amplifier 58 and compensation network 72. This results in a controlled rate of rise of $V_{OS}$.

The circuit of diode 168, resistor 164, and capacitor 162 form a peak detector which quickly charges capacitor 162 to the negative amplitude of the $v_1$ voltage level that appears across auxiliary winding 30 as the $V_{IN}$ is applied to transformer 18 through power switch transistor 24. Zener diode 172 becomes biased through current limiting resistor 178.

Reset control transistor 76 remains turned off until $V_{CC}$ voltage rail 68 and $V_{EE}$ voltage rail 70 become established and error amplifier 58 becomes operational. This keeps transistor 184 turned off. The full zener diode 172 voltage therefore appears across the gate-to-source connection of p-channel power MOSFET 192. Zener diode 172 is selected to ensure that the gate-to-source voltage of MOSFET 192 sufficiently exceeds the gate-to-source threshold to turn on MOSFET 192 into full conduction.

During the on-time interval $T_{ON}$, diode 194 is reverse-biased to block MOSFET 192 and resistor 190 from loading down the output of magnetic amplifier 42. At the start of $T_{OFF}$, diode 194 becomes forward-biased. This allows the drain current from MOSFET 192 to flow into magnetic amplifier 42 and provide reset of the magnetic flux in the core.

The present embodiment holds magnetic amplifier 42 in the shutdown mode until error amplifier 58 becomes operational. Resistor 190 is selected to provide sufficient magnetic amplifier reset current to ensure that magnetic amplifier 42 can fully withstand the entire volt-second product of the input waveform.

Magnetic amplifier control circuit 54 controls how long in time that start-up control circuit 54 forces magnetic amplifier 42 into full shutdown. Thus, as $V_{CC}$ voltage 68 and $V_{EE}$ voltage 70 become established and error amplifier 58 becomes operational, the output of error amplifier 58 gradually increases to turn on reset control transistor 76. The collector of reset control transistor 76 then gradually increases its supply of base current to transistor 184. As transistor 184 turns on, its collector-to-emitter voltage gradually decreases. This, in turn decreases the gate-to-source voltage of MOSFET 192.

When MOSFET 192 operates in its constant resistance region, a decrease in its drain-to-source voltage causes a proportional decrease in its drain current. Thus, in this mode of operation, the available magnetic amplifier 42 reset current gradually starts to decrease as error amplifier 58 becomes operational. As the magnetic amplifier 42 reset current decreases, so does the blocking time $T_B$ of magnetic amplifier 42. This allows the output voltage $V_{OS}$ to begin rising toward its steady-state voltage. The rate of rise of the output voltage $V_{OS}$ is, therefore, controlled by error amplifier 58 and compensation network 72. Additional control of the output rate of rise may be provided by including softstart capacitor 206 together with resistors 208 and 210 in the reference circuit for error amplifier 58.

When the output voltage $V_{OS}$ reaches its desired level, error amplifier 58 provides the necessary error voltage to supply the magnetic amplifier reset current for maintaining output voltage regulation. In start-up circuit 152, resistor 200 and capacitors 204 and 205 form a compensation network to control the frequency response of start-up control circuit to provide the desired stability margins.

Magnetic Amplifier Current Reset

The present embodiment further includes a magnetic amplifier topology having an auxiliary reset winding. The topology allows the magnetic amplifier post regulator in SMPS 10 to operate in the shutdown mode. In the present embodiment, an auxiliary magnetic amplifier winding is added to magnetic amplifier 42 to extend the dynamic range of the magnetic amplifier post regulator. With the proper selection of the number of turns to the auxiliary winding, the magnetic amplifier core can be sufficiently reset to insure complete blocking.

As the following discussion explains, the present embodiment overcomes a limitation that exists in the SMPS 10 of FIG. 1 as well as other known magnetic amplifier structures and provides for complete shutdown of the magnetic amplifier by adjusting the reset voltage so that reset transistor 76 remains in the active region when magnetic amplifier 42 is commanded to complete shutdown. The squareness of the core material and the saturated inductance of magnetic amplifier 42 limit the minimum blocking time $T_B$ of the auxiliary output circuit 14. Sufficient blocking time overhead must exist to account for these inherent delays. Equation (1) establishes the requirement for satisfying the volt-second balancing criteria for transformer 18. Thus, $$V_{IN}T_{ON}=(N_P/N_R)Vin(T_{OFF}-T_D) \qquad (1)$$

where $N_P$ equals the number of transformer primary turns, $N_S$ equals the number of transformer secondary turns, $N_R$ equals the number of transformer reset turns, $T_{ON}$ equals the power switch on-time, $T_{OFF}$ equals the power switch off-time, and $T_D$ equals the dead-time.

But $T_R=T_{OFF}-T_D$. Thus, Equation (1) simplifies to $$T_R=(N_R/N_P)T_{ON}. \qquad (2)$$

To satisfy the volt-second balancing in magnetic amplifier 42, it is necessary that $$(N_S/N_P)V_{IN}T_B=-V_RT_R, \qquad (3)$$

where $T_B$ equals the magnetic amplifier 42 blocking time, $T_R$ equals the magnetic amplifier 42 reset time, and $V_R$ equals the magnetic amplifier 42 reset voltage. Substituting Equation (2) into Equation (3) and rearranging, the result is Equation (4)

$$V_R=-(N_S/N_R)(T_B/T_{ON})V_{IN} \qquad (4)$$

Since $V_X=-(N_S/N_R)V_{IN}-V_R$, after substituting and rearranging $$V_X=(N_S/N_R)V_{IN}(T_B/T_{ON}-1) \qquad (5)$$

In auxiliary output circuit 14, the reset control current for magnetic amplifier 42 is derived from $V_{OS}$. This technique provides an output preload for magnetic amplifier 42 and prevents magnetizing current of magnetic amplifier 42 from raising the $V_{OS}$ at no-load. Neglecting the voltage drop across resistor 74, the reset current is as Equation (6) details:

$$I_c = \frac{V_{os} - V_e - V_{BE}}{R_{78}} \qquad (6)$$

where voltage $V_e$ is the output of error amplifier 58, and $V_{BE}$ is the base-emitter voltage of reset transistor 76. This current resets the magnetic flux density to the level required to achieve the proper blocking time $T_B$ for the subsequent positive input pulse. The blocking time is determined from Faraday's Law to be $$T_B=[N_P/N_S)N_1A_E(B_S-B_1)(10^{-8})]/V_{IN} \qquad (7)$$

where $N_1$ equals the number of turns in magnetic amplifier 42 winding, $A_E$ equals the cross sectional area of magnetic amplifier 42 core, $B_S$ equals the saturation flux density of magnetic amplifier 42 core, and $B_1$ equals the magnetic flux density after reset.

The collector-to-emitter voltage across reset transistor 76 during the reset interval is $$V_{CE}=V_X-V_{OS}+V_D+I_ER_{78} \qquad (8)$$

where $V_{OS}$ equals the output voltage of auxiliary output circuit 14, $V_D$ equals the voltage drop across diode 86, $I_ER_{78}$ equals the voltage drop across resistor 78. Substituting Equation (5) into Equation (8), Equation (9) demonstrates the shortcoming of the known methods of achieving at zero value for $V_{OS}$ while trying to make $T_B$ equal $T_{ON}$:

$$V_{CE} = \frac{N_S}{N_R} V_{IN} \left( \frac{T_B}{T_{ON}} - 1 \right) - V_{OS} + V_D + I_E R_{78} \quad (9)$$

Equation (9) can be used to solve for $T_B$, yielding the following expression of Equation (10):

$$T_B = \frac{N_R}{N_S} \left[ \frac{V_{CE} + V_{OS} - V_D - I_E R_{78} + \frac{N_S}{N_R} V_{IN}}{V_{IN}} \right] T_{ON} \quad (10)$$

For complete shutdown, $T_B = T_{ON}$. Thus Equation 10 reduces to $$\frac{N_R}{N_S} \left[ \frac{V_{CE} + V_{OS} - V_D - I_E R_{78} + \frac{N_S}{N_R} V_{IN}}{V_{IN}} \right] = 1 \quad (11)$$

And, this expression yields the result that, for complete shutdown, $$V_{OS} = V_D + I_E R_{78} - V_{CE} \quad (12)$$

For a PNP transistor such as reset transistor 76, $V_{CE}$ is less than zero. Also, typical minimum values are that $V_D = 0.7$ V, $V_{CE} = -1$ V (to assure linear operation), and $I_E R_{78} = 1$ V. But, this means that $V_{OS} = 2.7$ V for complete shutdown. Consequently, with the present auxiliary output circuit 14 and magnetic amplifier control circuit 54, it is not possible that $V_{OS}$ equal zero and $T_B$ equal $T_{ON}$. That is, in the known auxiliary circuits, there is not sufficient compliance voltage to achieve complete shutdown.

Figure 4:
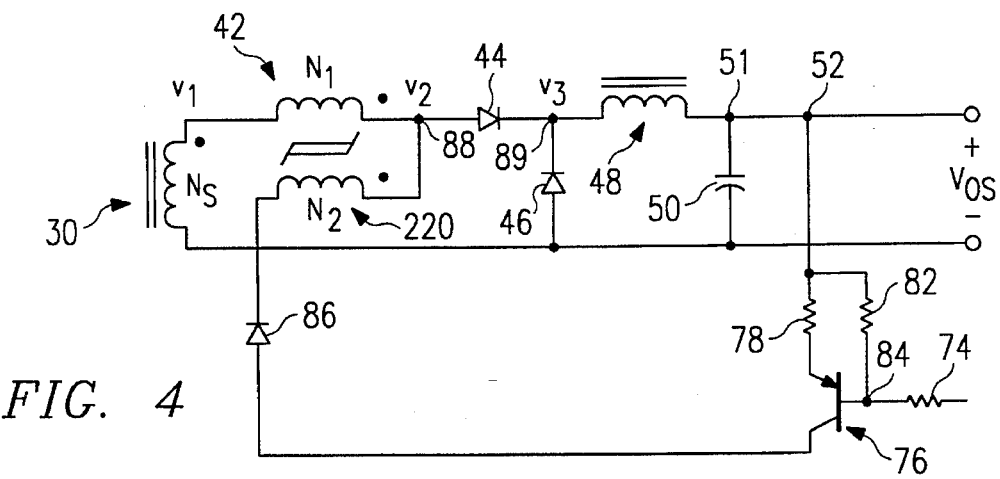
FIG. 4 shows the present embodiment for providing reset control of the magnetic amplifier.

FIG. 4 illustrates how the present embodiment overcomes the above problem to provide a novel modification to the conventional magnetic amplifier 42 structure for the purpose of providing complete shutdown of auxiliary output circuit 14. In FIG. 4, auxiliary magnetic amplifier winding 220 forms part of the reset current path to magnetic amplifier 42. Auxiliary magnetic amplifier winding 220 possesses a number of turns, $N_2$, that depends on its placement as the following equations explain. With auxiliary magnetic amplifier winding 220, during the reset interval of magnetic amplifier 42, the collector-to-emitter voltage across reset transistor 76 becomes $$V_{CE} = (N_S/N_R)V_{IN}(T_B/T_{ON} - 1) - (N_2/N_1)(N_S/N_R)V_{IN}(T_B/T_{ON}) - V_{OS} + V_D + I_E R_{78} \quad (13)$$

$N_1$ equals the number of turns in the main magnetic amplifier winding, and $N_2$ equals the number of turns in auxiliary magnetic amplifier winding 220. For complete blocking, Equation (13) reduces to $$V_{CE} = -(N_2/N_1)(N_S/N_R)V_{IN} + V_D + I_E R_{78} \quad (14)$$

From Equation (14) and solving for $N_2$, it is possible to determine the necessary number of turns for auxiliary magnetic amplifier winding 220.

$$N_2 = [(N_R/N_S)(-V_{CE} + V_D + I_E R_{78})]N_1/V_{IN} \quad (15)$$

Therefore, from the above relationships, it is possible to adjust the number of auxiliary turns to ensure that the reset transistor does not saturate as the output voltage $V_{OS}$ approaches zero volts.

Figure 5:
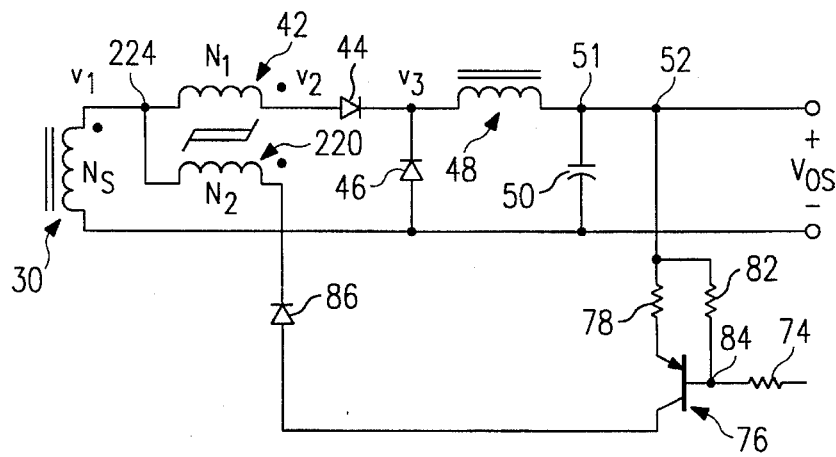
FIG. 5 shows an alternative embodiment for controlling magnetic amplifier reset.

FIG. 5 shows an alternate implementation of auxiliary magnetic amplifier winding 220. For this implementation, the collector-to-emitter voltage of reset transistor 76 during the reset interval becomes $$V_{CE} = (N_2/N_1)(N_S/N_R)V_{IN}(T_B/T_{ON}) - (N_S/N_R)V_{IN} - V_{OS} + V_D + I_E R_{78} \quad (16)$$

For complete blocking, Equation (16) reduces to $$V_{CE} = (N_S/N_R)V_{IN}(N_2/N_1 - 1) + V_D + I_E R_{78} \quad (17)$$

The expression that solves for $N_2$ is $$N_2 = (N_R/N_S)[(N_S/N_R)V_{IN} + V_{CE} - V_D - I_E R_{78}]N_1/V_{IN} \quad (18)$$

Even with this formulation, the number of turns for auxiliary magnetic amplifier winding 220 may be adjusted to ensure that reset transistor 76 does not saturate as the output voltage $V_{OS}$ approaches zero.

A distinction between the embodiments of FIGS. 4 and 5 is that for the FIG. 4 embodiment the number of auxiliary turns $N_2$ will be a small percentage of the number of main turns $N_1$. In the FIG. 5 embodiment, the number of auxiliary turns is only slightly less than the number of main turns.

In summary, the present embodiment provides a magnetic amplifier reset mechanism that includes an auxiliary magnetic amplifier winding that is added to the magnetic amplifier to extend the dynamic range of the auxiliary output circuit 12. With proper selection of the number of turns in auxiliary magnetic amplifier winding 220, magnetic amplifier 42 can be sufficiently reset to ensure that complete blocking can be achieved.

OPERATION

Although operation of the present embodiment of both magnetic amplifier 42 start-up control circuit 152 and auxiliary magnetic amplifier winding 220 is well understood from the above description, for the purpose of completeness the following discussion describes in yet more detail operation of one additional embodiment of the present invention. The following discussion describes operation of the present invention in SMPS 10 with the initial application of the input voltage $V_{IN}$ at primary circuit 16 and going to the final production of the main output voltage $V_{OM}$ and the secondary output voltage $V_{OS}$ using the start-up control circuit of the present embodiment.

Figure 6:
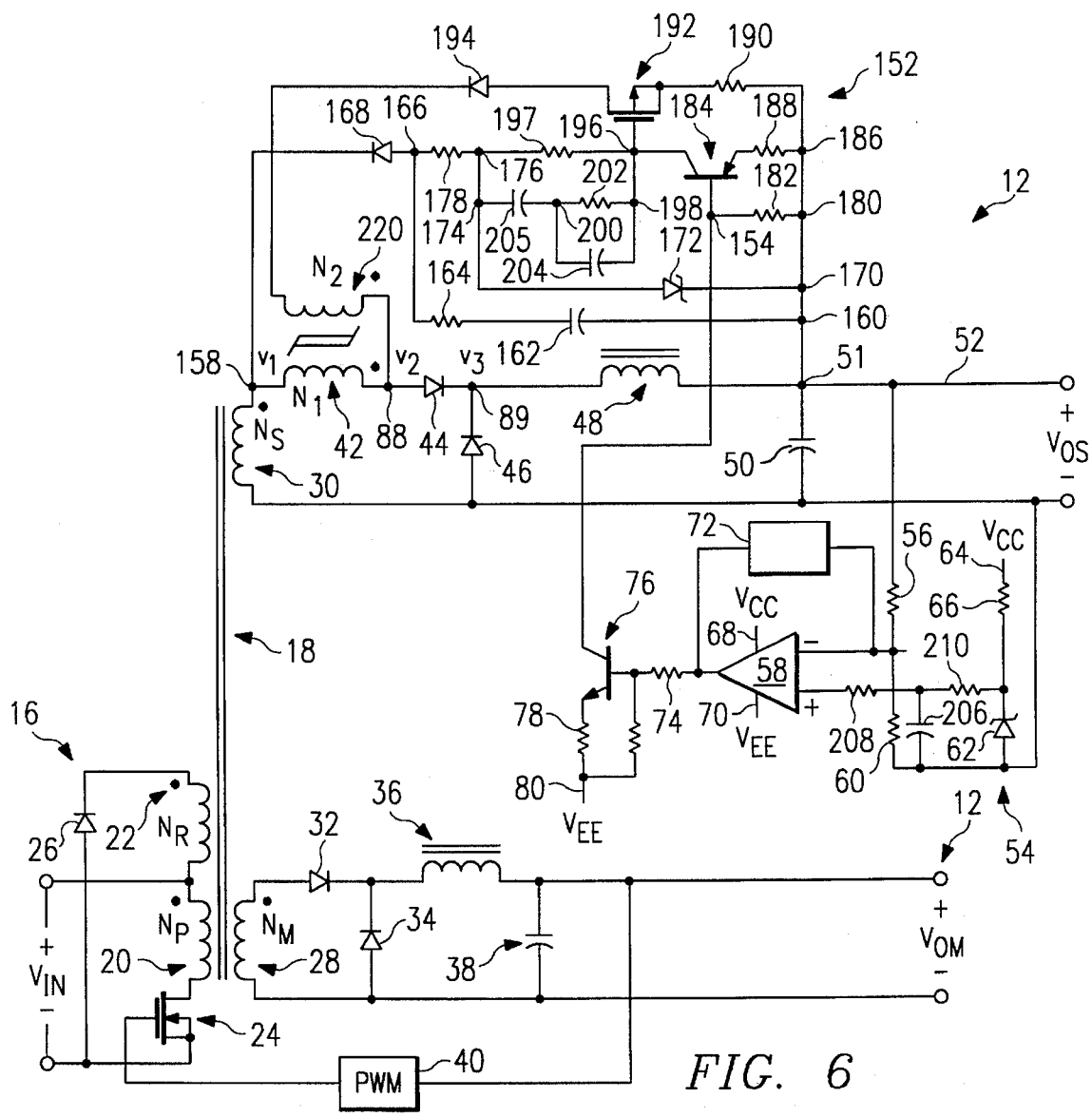
FIG. 6 illustrates yet a further embodiment of the present invention that incorporates both start-up control and reset control according to the concepts of the present invention.

Referring both to FIGS. 2 and 6, upon application of $V_{IN}$, PWM 40 controls the main output voltage $V_{OM}$ by controlling the transistor 24 duty cycle. PWM 40 turns on transistor 24 at a fixed clock rate and turns off transistor 24 based on whether $V_{OM}$ satisfies predetermined output regulation setpoints. In steady state operation, $V_{OM}$ is determined by $V_{IN}$, the turns ratio, $N_M/N_P$, and the PWM 40 duty cycle. The PWM 40 duty cycle is the ratio of $T_{ON}$ divided by T, where T is the total time period for a cycle (i.e., the sum of $T_{ON}$ and $T_{OFF}$). Thus, during steady states PWM 40 holds $V_{OM}$ in regulation.

The PWM 40 duty cycle is adjusted to hold $V_{OM}$ at some predetermined value. As the input voltage changes, the PWM 40 re-adjusts the duty cycle so that $V_{OM}$ comes back into regulation. As transistor 24 turns on and off to generate an AC voltage on the primary side winding 20, transformer 18 couples across to secondary winding 28 to produce a voltage waveform similar to $V_1$ in FIG. 2. That is, the voltage waveform at main secondary winding 28 is the same as $V_1$, except that the ratio of $N_M/N_P$ applies to $V_{IN}$, instead of $N_S/N_P$. Diodes 32 and 34 are rectifiers that clip off the negative-going portion of the main winding voltage so that current always flows through inductor 36 in the same direction. Inductor 36 is often called an averaging inductor and its function is to smooth out the AC current flow. Capacitor 38 filters out the AC component of the current that passes through inductor 36. The result is $V_{OM}$ which is a constant DC value.

At the same time that transformer 18 produces the voltage waveform for $V_{OM}$, by transformer action in auxiliary secondary winding 30, waveform $V_1$ occurs. The amplitude is proportional to the turns ratio, $N_S/N_P$, which is the ratio of auxiliary secondary winding 30 to primary winding 20. Auxiliary secondary winding 30 generates an average value ultimately for $V_{OS}$ that is higher than that which is desired at the output for auxiliary output circuit 14. In other words, magnetic amplifier 42 is a step-down regulator. It has a duty cycle that is greater than the duty cycle required to produce the desired output voltage $V_{OS}$. Magnetic amplifier 42 steps down the voltage by acting as a magnetic switch that modifies the waveform $v_m$ to give an effective duty cycle $v_2$ with a positive amplitude that is the same as that of $v_1$.

Notice that a difference between $v_2$ and $v_1$ of FIG. 2 is the leading edge has been delayed by a small amount of time $T_B$. Thus, during the positive portion of a cycle, diode 44 conducts and puts energy into inductor 48 and delivers current to the load. Diode 46 is reverse biased during the positive portion of the voltage cycle that is, during $T_F$. During $T_{OFF}$, since inductor 48 stores energy, an inductive kick occurs to cause inductor 48 current to continue to flow through communication diode 46. The magnetic amplifier 42 voltage at that instant in time is reversed in direction. This reverse biases rectifier 44.

In turning on SMPS 10, voltage rails $V_{CC}$ and $V_{EE}$ and error amplifier 58 are not yet in full operation. So start-up circuit 152 controls operation of magnetic amplifier 42. $V_{CC}$ and $V_{EE}$ are not present, because they are typically generated locally by an internal supply that itself has not had sufficient time to establish these values. Consequently, magnetic amplifier control circuit 54 does not have the proper voltages available to provide reset of magnetic amplifier 42.

The first cycle that comes along saturates magnetic amplifier 42. Moreover, at start-up, without start-up control circuit 152 there is no reset capability available, so magnetic amplifier 42 stays saturated. That is, in the first cycle, magnetic amplifier 42 is driven into saturation at a magnetic field strength according to the number of turns in magnetic amplifier 42 and the current flow through magnetic amplifier 42. Upon removing the current, due to the polarity reversal itself at the input voltage, i.e. $V_1$, and the blocking action of diode 44, the magnetic field goes to zero. The magnetic field going to zero, however, does not reset the magnetic flux of magnetic amplifier 42. Magnetic amplifier 42, therefore, remains in saturation unless a reset current becomes available.

As long as magnetic amplifier 42 remains in saturation, no blocking of input voltage $v_1$ occurs for any of the subsequent cycles. In order to take magnetic amplifier 42 out of saturation, a reset current is necessary, but until magnetic amplifier control circuit 54 becomes fully operational, it cannot provide the necessary reset current.

Because, during start-up, it is not practical to depend on magnetic amplifier control circuit 54, the present embodiment provides start-up control circuit 152. During start-up, magnetic amplifier 42 operates as if magnetic amplifier control circuit 54 were not present. Start-up control circuit 152 very rapidly, i.e., during the first cycle, resets magnetic amplifier 42. In the first cycle that comes along, during the positive portion of the cycle, diode 194 is back biased. This prevents current from start-up control circuit 152 from loading down the output of magnetic amplifier 42. During the negative portion, which is normally when the reset occurs, diode 168 becomes forward biased. This charges capacitor 162 through resistor 164, which together act as a peak detector that charges very rapidly due to the small resistance value of resistor 164 and relatively small capacitance of capacitor 162. This establishes a voltage at the anode of diode 168. Upon establishing a voltage at the anode of diode of 168, zener diode 172 clamps and thereby determines the voltage at the junction of resistors 178 and 197.

At that same moment in time, transistor 184 is turned off because there is no collector current from reset control transistor 76 of magnetic amplifier control circuit 54. The node 196 voltage at the gate of the MOSFET 192, is approximately the same as the zener diode 172 voltage. This is because there is no current flow through this path and, therefore, no voltage drop across resistor 197. With the full potential applied, MOSFET 192 turns on fully. The zener diode 172 voltage is selected to insure that MOSFET 192 turns on hard.

During the reset interval $T_R$, diode 194 becomes forward biased and a reset current determined by resistor 190 flows to magnetic amplifier 42. Moreover, with the node 196 voltage at its highest level, MOSFET 192 turns on its hardest. This gives magnetic amplifier 42 full reset current. The full reset current places magnetic amplifier 42 in full shutdown. This holds magnetic amplifier 42 off and, therefore, holds $V_{OS}$ at its zero level until such time as magnetic amplifier control circuit 54 establishes its voltage rails and the error amplifier 58 slew rate reaches a fully operational level. When this occurs, current flows from reset control transistor 76 to the base of transistor 184.

Reset control transistor 76 produces this current at this point because once error amplifier 58 starts coming up and tries to regulate, it recognizes that $V_{OS}$ is far below its predetermined regulation setpoint. When magnetic amplifier control circuit 54 begins to regulate it supplies base current to transistor 184.

As transistor 184 turns on, its collector-to-emitter voltage gradually decreases. This also decreases the gate-to-source voltage of MOSFET 192. As MOSFET 192 enters its constant resistance region, the corresponding decrease in its drain-to-source voltage causes a proportional decrease in its drain current.

Eventually, when magnetic amplifier control circuit 54 is fully operable for controlling magnetic amplifier 42, error amplifier 58 controls the operation of reset control transistor 76. Reset control transistor 76, in turn controls the operation of transistor 184, and transistor 184 controls the operation of MOSFET 192. It is MOSFET 192 that provides the necessary reset current to magnetic amplifier 42 in the present embodiment. The operation of MOSFET 192 is thereby controlled by error amplifier 58.

In operating the FIG. 6 embodiment in a no-load condition, although the reset circuit is still referenced to the output, the equations that control are slightly different from those provided above. That is, instead of including in the equations values for resistor 78, diode 86, and using reset transistor 76 to direct reset current to magnetic amplifier 42, the FIG. 6 embodiment depends on the values of resistor 190, MOSFET 192, and diode 194. Moreover, auxiliary magnetic amplifier winding 220 is formed from the connection between node 88 and MOSFET 192 with the phase as FIG. 6 indicates. Otherwise, in operation, auxiliary output circuit 12 may achieve a zero $V_{OS}$ with $T_B$ equaling $T_{ON}$ because of auxiliary magnetic amplifier winding 220 as Equations (1) through (17), above explain.

ALTERNATIVE EMBODIMENTS

In summary, the present embodiment provides a start-up control circuit 152 for regulating the output voltage $V_{OS}$ of a power supply circuit 150 having a magnetic amplifier control circuit 54. The magnetic amplifier control circuit 54 includes magnetic amplifier 42 and error detection circuitry having voltage rails 68 and 70 and error amplifier 58 together with reset control transistors 76. Start-up control circuit 152 includes sensing circuitry that includes transistor 184 for generating sensing signals in response to voltage levels in error detection circuitry including $V_{CC}$ voltage rail 68, $V_{EE}$ voltage rail 70, error amplifier 58, and reset control transistor 76. The sensing signals indicate whether the error detection circuitry voltage levels are sufficient to drive magnetic amplifier control circuit 54. Reset circuitry including resistor 190, MOSFET 192, and diode 194 associate with the sensing circuitry of reset control transistor 76, transistor 184, and zener diode 172 for initially resetting magnetic amplifier 42 to prohibit output voltage $V_{OS}$ from power supply circuit 150 when the sensing signals indicate that the voltage levels are insufficient for the error detection circuitry to drive magnetic amplifier control circuit 54. Reset circuitry including resistor 190, MOSFET 192, and diode 194 further associate with reset control transistor 76 through transistor 184 for controllably decreasing the reset of magnetic amplifier 42 and, thereby, controllably increasing output voltage $V_{OS}$. The reset circuitry including resistor 190, MOSFET 192, and diode 194 further associate with magnetic amplifier control circuit 54 through transistor 184 and reset control transistor 76 for shifting control of magnetic amplifier 42 to magnetic amplifier control circuit 54 as voltage levels increase sufficiently for the error detection circuitry including $V_{CC}$ voltage rail 68, $V_{EE}$ voltage rail 70, and error amplifier 58 to drive magnetic amplifier control circuit 54 and control operation of magnetic amplifier 42 to regulate output voltage $V_{OS}$ of power supply circuit 150.

There are any number of alternatives or changes in the method for controlling the start-up characteristics of a power supply having a magnetic amplifier control circuit that may be readily apparent to one of ordinary skill in the art. Such alternatives may not be employed in the present embodiment for any number of reasons, such as costs and performance considerations, size constraints, availability of materials, arbitrary design decisions, and the like. A number of these alternatives have been mentioned above. Thus, the present invention is intended to be limited only by the claims which are meant to cover such obvious alternatives and deviations from the preferred design.

What is claimed is:

1. A start-up control circuit for regulating the output voltage of a power supply circuit having a magnetic amplifier control circuit, said magnetic amplifier control circuit comprising a magnetic amplifier and error detection circuitry, said start-up control circuit, comprising:

sensing circuitry for generating sensing signals in response to voltage levels in the error detection circuitry, said sensing signals indicating whether said error detection circuitry voltage levels are sufficient to drive the magnetic amplifier control circuit; and reset circuitry associated with said sensing circuitry and said magnetic amplifier control circuit for initially resetting the magnetic amplifier to prohibit output voltage from the power supply circuit when said sensing signals indicate that said voltage levels are insufficient for the error detection circuitry to drive the magnetic amplifier control circuit, said reset circuitry further associated with the magnetic amplifier control circuit for controllably decreasing the reset of the magnetic amplifier for controllably increasing said output voltage, said reset circuitry further associated with the magnetic amplifier control circuit for shifting control of said magnetic amplifier to the magnetic amplifier control circuit as said voltage levels increase sufficiently for the error detection circuitry to drive the magnetic amplifier control circuit and control operation of the magnetic amplifier and, thereby, regulate the power supply circuit output voltage.

2. The start-up control circuit of claim 1, wherein said sensing circuitry responds to the output of an error amplifier having a predetermined slew rate and the magnetic amplifier control circuit receives a plurality of voltage rails, and further wherein said sensing circuitry generates said sensing signals in response to the slew rate of the error amplifier and the plurality voltage rails.

3. The start-up circuit of claim 1, wherein said reset circuitry comprises a resistor, a power transistor, and a diode for directing a reset current to the magnetic amplifier for operating the magnetic amplifier in a shutdown mode until said sensing signals indicate that the error detection circuitry voltage levels are sufficient to drive the magnetic amplifier control circuit.

4. The start-up circuit of claim 1, wherein said reset circuitry comprises circuitry for biasing the magnetic amplifier during the magnetic amplifier off-time for shifting the magnetic amplifier to a reset condition, thereby blocking output voltage from the magnetic amplifier until the voltage level in the error detection circuitry increase sufficiently to drive the magnetic amplifier control circuit.

5. The start-up control circuit of claim 1, further comprising rise rate control circuitry associated with the error detection circuitry for controlling the increase of the voltage level in error detection circuitry, thereby controlling the decrease in the reset of the magnetic amplifier and, further, more controllably increasing the power supply circuit output voltage.

6. A method for regulating the output voltage of a power supply circuit having a magnetic amplifier control circuit, the magnetic amplifier control circuit comprising a magnetic amplifier and error detection circuitry, the method comprising the steps of:

generating sensing signals in response to voltage levels in the error detection circuitry, the sensing signals indicating whether the error detection circuitry voltage levels are sufficient to drive the magnetic amplifier control circuit;

initially resetting the magnetic amplifier to prohibit output voltage from the power supply circuit when the sensing signals indicate that the voltage levels are insufficient for the error detection circuitry to drive the magnetic amplifier control circuit;

controllably decreasing the reset of the magnetic amplifier for controllably increasing the output voltage from the power supply circuit as the voltage levels increase sufficiently for the error detection circuitry to drive the magnetic amplifier control circuit; and shifting control of the magnetic amplifier to the magnetic amplifier control circuit as the voltage levels increase sufficiently for the error detection circuitry to drive the magnetic amplifier control circuit and control operation of the magnetic amplifier in regulating the power supply circuit output voltage.

7. The method of claim 6, wherein said generating sensing signals that further comprises the step of generating sensing signals in response to determining that an error amplifier of the error detection circuitry has established a predetermined slew rate and further wherein said sensing signals indicate that the error amplifier has sufficiently high voltage rails so that the error amplifier drives the magnetic amplifier control circuit.

8. The method of claim 6, further comprising the step of controlling the increase of the voltage level to the error detection circuitry for more controllably decreasing the reset of the magnetic amplifier and, thereby, more control of the increasing of the output voltage from the power supply circuit and more controllably shifting control of the magnetic amplifier from the reset circuitry to the magnetic amplifier control circuit.

9. Power supply circuit for a switched-mode power supply, comprising:

an auxiliary secondary winding associated with a transformer of the Switched-mode power supply for the receiving a portion of the input voltage from the switched-mode power supply;

a magnetic amplifier control circuit comprising a magnetic amplifier and error detection circuit, said magnetic amplifier for producing a controlled magnetic amplifier output voltage, said error detection circuitry for comparing the output voltage of said power supply circuit to the referenced voltage and controlling said magnetic amplifier to maintain said magnetic amplifier output voltage so as to produce a desired power supply circuit output voltage;

a start-up control circuit comprising sensing circuitry and reset circuitry;

said sensing circuitry for generating sensing signals in response to voltage levels in said error detection circuitry, said sensing signals indicating whether said error detection circuitry voltage levels are sufficient to drive said magnetic amplifier control circuit; and reset circuitry associated with said sensing circuitry and said magnetic amplifier control circuit for initially resetting said magnetic amplifier to prohibit output voltage from said power supply circuit when said sensing signals indicate that said voltage levels are insufficient for said error detection circuitry to drive said magnetic amplifier control circuit, said reset circuitry further associated with said magnetic amplifier control circuit for controllably decreasing the reset of said magnetic amplifier for controllably increasing said output voltage, said reset circuitry further associated with said magnetic amplifier control circuit for shifting control of said magnetic amplifier from said start-up control circuit to said magnetic amplifier control circuit as said voltage levels increase sufficiently for said error detection circuitry to drive said magnetic amplifier control circuit and control operation of said magnetic amplifier to regulate the power supply circuit output voltage.

10. The power supply circuit of claim 9, wherein said error detection circuitry comprises an error amplifier having a predetermined slew rate and wherein said power amplifier further receives a plurality of voltage rails, and further wherein said sensing circuitry generates said sensing signals in response to the slew rate of said power amplifier and said plurality of voltage rails.

11. The power supply circuit of claim 9, further comprising a power transistor within said reset circuitry for directing reset current to said magnetic amplifier for operating said magnetic amplifier control circuit in a shutdown mode until said sensing signals indicate that said voltage levels are sufficient for said error detection circuitry to drive said magnetic amplifier control circuit.

12. The power supply circuit of claim 9, further comprising control circuitry within said magnetic amplifier control circuit for controlling the rate of voltage increase to said error detection circuitry for more controllably increasing the output voltage of said power supply circuit.

\* \* \* \* \*